United States Patent
Gallant et al.

(10) Patent No.: US 6,539,219 B1
(45) Date of Patent: Mar. 25, 2003

(54) SYSTEMS AND METHODS FOR PROVIDING AN INTELLIGENT NETWORK (IN) SERVICE TO TRANSPARENTLY ESTABLISH A MID-CALL CONFERENCE WITHOUT REQUIRING AN INTERMEDIATE HOLD STATE

(75) Inventors: Rene Gallant, Plano, TX (US); Muhammad Arshad Khan, Richardson, TX (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/414,321

(22) Filed: Oct. 6, 1999

(51) Int. Cl.[7] ................................................ H04M 3/42
(52) U.S. Cl. .................. 455/416; 455/519; 379/202.01; 370/260; 370/261
(58) Field of Search .................................. 455/414, 416, 455/445, 560, 516, 518, 519, 186.1; 379/142.01, 202.1, 203.1, 204.1, 205.1, 206.1, 207.1, 216.01; 370/260, 261

(56) References Cited

U.S. PATENT DOCUMENTS

| 5,452,348 A | * | 9/1995 | Adams et al. | 379/202.01 |
| 5,511,111 A | * | 4/1996 | Serbetcioglu et al. | 379/142.01 |
| 5,603,084 A | * | 2/1997 | Henry et al. | 455/186.1 |
| 5,898,917 A | * | 4/1999 | Batni et al. | 379/216.01 |
| 5,987,318 A | * | 11/1999 | Alperovich et al. | 455/416 |

* cited by examiner

Primary Examiner—Lester G. Kincaid
Assistant Examiner—Ronald J Ward
(74) Attorney, Agent, or Firm—Roger S. Burleigh; Ericsson Inc.

(57) ABSTRACT

Systems and methods related to providing an Intelligent Network (in) service to transparently establish a mid-call conference using a Mobile Station (MS), without requiring an intermediate hold state of an existing call connection between the MS and a second telephony device; such systems and methods can be adapted to implementation in any wireless communications network, such as a Global Services for Mobile Communication (GSM) network. In an exemplary embodiment, a wireless communications network adapted to provide the IN service includes a Mobile-services Switching Center (MSC), and a Service Control Point (SCP), wherein the MSC is operative to send a request to the SCP to activate the IN service, and the SCP is operative to send a Prompt&Collect_User_Information command to the MSC. The Prompt&Collect_User_Information command instructs the MSC to monitor a control channel for the transmission of dialed digits from the MS; the dialed digits identify a third telephony device to be joined in conference with the MS and a second telephony device. The MSC sends an acknowledgment message to the SCP upon receipt of the dialed digits; the acknowledgment message includes the dialed digits. The SCP then controls the establishment of a call connection to the third telephony device, using the dialed digits, by sending a call setup request to the MSC.

12 Claims, 2 Drawing Sheets

SYSTEMS AND METHODS FOR PROVIDING AN INTELLIGENT NETWORK (IN) SERVICE TO TRANSPARENTLY ESTABLISH A MID-CALL CONFERENCE WITHOUT REQUIRING AN INTERMEDIATE HOLD STATE

TECHNICAL FIELD OF THE INVENTION

The present invention is directed, in general, to communications systems and, more specifically, to systems and methods for providing an Intelligent Network (IN) service to transparently establish a mid-call conference using a Mobile Station (MS), without requiring an intermediate hold state of an existing call connection between the MS and a second telephony device.

BACKGROUND OF THE INVENTION

The world is currently experiencing revolutionary changes in communications systems, brought about, in part, by the general availability of access to, and evolution of, wireless telephony systems. It has been predicted that wireless telephony will eventually replace much of the existing wireline telephony systems; the period during which that will occur, however, is likely to be a function of the ability of wireless telephony systems to provide the features that subscribers have come to expect from wireline systems, including the availability of advanced Intelligent Network (IN) services.

Intelligent Network (IN) services refers generally to a collection of services offered to telephony system subscribers on a pre-subscribed basis, such as Calling Number Delivery, Calling Number Blocking, Customer Originated Trace, Automatic Recall, Automatic Callback, Selective Call Forwarding, Selective Call Waiting, Selective Call Rejection, and Selective Call Acceptance. The collection of IN services is continually growing, however, as telecommunications system engineers devise both improved and novel systems and processes for providing advanced services. Although IN services often can be easily implemented in wireline networks, the implementation of IN services in wireless telecommunications systems can present unique challenges due to limitations of such systems.

One popular IN service is call conferencing; as used herein, a "conference" is the simultaneous connection of three or more parties in voice communication, and "conferencing" refers to the process used to establish a conference. In conventional telephony systems, a conference setup process requires one party to a call to place the second party to the call on "hold," establish a second call connection to a third party, and then join the second party by taking such party off hold; the conferencing process can be repeated to further join additional parties. The need to place one or more parties on hold while conferencing additional parties is often undesirable, however, particularly in wireless telecommunications systems.

If it is necessary to place a call party or parties on hold in order to conference a third party, the existing call participants are unable to continue a conversation during the process of conferencing the third party. In a wireless system, a user of a wireless telephony device will incur additional air-time charges during such hold period. Accordingly, there is a need in the art for systems and methods for providing an Intelligent Network (IN) service to transparently establish a mid-call conference without requiring an intermediate hold state.

SUMMARY OF THE INVENTION

To address the above-discussed deficiencies of the prior art, the present invention provides systems and methods related to providing an Intelligent Network (IN) service to transparently establish a mid-call conference using a Mobile Station (MS), without requiring an intermediate hold state of an existing call connection between the MS and a second telephony device.

Using an exemplary method described in detail hereinafter, the IN service is implemented by: i) monitoring for the transmission of dialed digits over a control channel associated with a MS; the dialed digits identifying a third telephony device; ii) establishing a call connection to the third telephony device; and iii) joining the third telephony device in conference with an existing call connection between the MS and a second telephony device, thereby establishing a conference call between the MS and the first and second telephony devices without requiring an intermediate hold state of the existing call connection.

The monitoring operation can be performed by a Mobile-services Switching Center (MSC). In such embodiments, the monitoring operation is preferably preceded by querying a Home Location Register (HLR) for subscriber information associated with the MS; the subscriber information identifies whether the IN service is to be provided to the MS. If the IN service is to be provided, the MSC sends an IN service activation request to a Service Control Point (SCP). The SCP responds by sending Prompt&Collect_User_Information command to the MSC; the command instructs the MSC to monitor a control channel associated with the MS for the transmission of dialed digits from the MS. Upon receiving dialed digits on the control channel, the MSC sends an acknowledgment message to the SCP; the acknowledgment message includes the dialed digits received over the control channel associated with the MS.

The operation to establish a call connection to the third telephony device can be controlled by the SCP using a resident Service Control Function (SCF). In an exemplary embodiment, the SCF sends a request to the MSC to establish a call connection to the third telephony device; the request includes the dialed digits. The MSC can use a resident Service Switching Function (SSF) to establish the call connection. Upon establishing the call connection to the third telephony device, the SSF then performs the operation of joining the third telephony device in conference with the existing call connection between the MS and the second telephony device.

The foregoing has outlined, rather broadly, the principles of the present invention so that those skilled in the art may better understand the detailed description of the exemplary embodiments that follow. Those skilled in the art should appreciate that they can readily use the disclosed conception and exemplary embodiments as a basis for designing or modifying other structures and methods for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following detailed description taken in conjunction with the accompanying drawings, in which.

DETAILED DESCRIPTION

Figure 1:
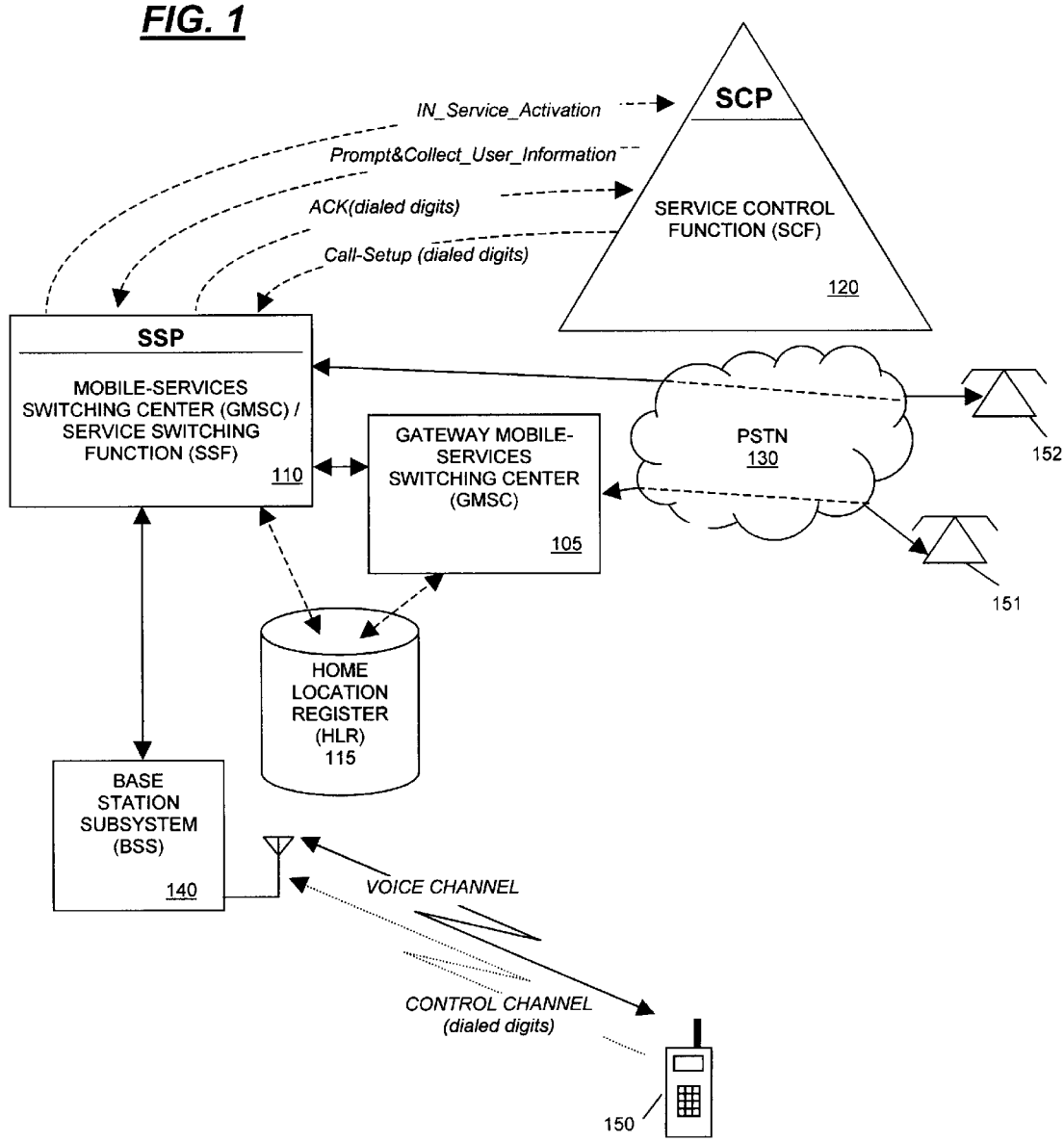
FIG. 1 illustrates a functional schematic of an exemplary wireless communications network including the principles of the present invention.

In order to understand better the features and advantages of the present invention, reference is made first to FIG. 1, which illustrates a functional schematic of an exemplary wireless communications network adapted to provide an Intelligent Network (IN) service to transparently establish a mid-call conference using a Mobile Station (MS) 150 while the MS is communicating with a second telephony device 151.

The wireless communications network provides wireless services to a Mobile Station (MS) 150, and is also linked with the Public Switched Telephone Network (PSTN) 130 to provide communications with wireline telephony devices, such as telephony devices 151 and 152. A conventional wireless communications network includes a Gateway Mobile-services Switching Center (GMSC) 105, a Home Location Register (HLR) 115, at least one Mobile-services Switching Center (MSC) 110, and at least one Base Station Subsystem (BSS) 140 associated with MSC 110.

The HLR 115 is a database containing information about "home" subscribers, their services and their current locations. For purposes of this application, "home" is defined as the wireless communications service provider with which the subscriber has a service agreement. When MS 150 travels into the geographical area serviced by MSC 110, MSC 110 communicates with the HLR 115 to authenticate and verify telecommunications service for the MS 150, and to retrieve pertinent subscriber information from the home HLR 115. Once authenticated, the mobile station 150 is registered as a "roaming" subscriber and is provided with telecommunications service.

A telephony device, such as a wireline telephony device 151, originates a call to MS 150 by dialing a directory number, such as a Mobile Subscriber Integrated Service Digital Network (MSISDN) number, associated with MS 150. A call setup signal is initially routed from the PSTN 130 to the GMSC 105 serving the home wireless communications network for the MS 150. The GMSC 105 queries the HLR 115 in response to the call setup signal to determine the identity of the MSC currently providing service to the MS 150. The GMSC 105 accomplishes this by sending a signal requesting a routing instruction to the HLR 115. The HLR 115 determines the identity of the MSC currently serving the MS 150, in this case MSC 110, and then transmits a signal requesting a roaming number for the MS 150 to MSC 110. The MSC 110 verifies that the MS 150 is currently within its service area and returns the roaming number to the HLR 115. The HLR 115 then forwards the received roaming number to the GMSC 105. Utilizing the roaming number for the MS 150, GMSC 105 reroutes the received call setup signal from the PSTN 130 to the MSC 110. The MSC 110 then pages the MS 150 over a page channel (PCH) via BSS 140 and, upon receiving a response therefrom, establishes a voice connection with the MS 150 over a "voice channel," also referred to as a traffic channel (TCH). Using other procedures, known to those skilled in the art, the MS 150 can also initiate and establish a call connection to another telephony device, such as telephony device 151.

The principles of the present invention are utilized during a call connection between MS 150 and another telephony device, such as telephony device 151, to transparently establish a mid-call conference with another telephony device, such as telephony device 152, without requiring an intermediate hold state of the existing call connection between the MS 150 and telephony device 151. In a Global Services for Mobile Communication (GSM) network, the principles of the present invention can be implemented, in part, by using the Prompt&Collect_User_Information functionality defined in *Digital Cellular Telecommunications System* (Phase 2+); *Customised Applications for Mobile Network Enhanced Logic* (CAMEL) Phase 2; Stage 2 (GSM 0.378 version 6.2.0 Release 1997), incorporated herein by reference.

According to the principles disclosed herein, the MS 150 can transparently establish a mid-call conference by transmitting dialed digits to the wireless telecommunications network over a control channel associated with the MS; the dialed digits identify a third telephony device, such as telephony device 152, which is to be coupled in a conference call configuration with the MS 150 and a second telephony device, such as telephony device 151. The wireless telecommunications network continuously monitors the control channel for such dialed digits and, upon receipt thereof, establishes a call connection to the third telephony device 152 and joins it in conference with the existing call connection between the MS 150 and second telephony device 151, thereby establishing a conference call between the MS 150 and the first and second telephony devices 151, 152 without requiring an intermediate hold state of the existing call connection.

The monitoring operation can be performed by the Mobile-services Switching Center (MSC) 110. In such embodiments, the monitoring operation is preferably preceded by querying the Home Location Register (HLR) 105 for subscriber information associated with the MS 150; the subscriber information identifies whether the IN service is to be provided to the MS 150—this operation is generally done in association with the establishment of the first call connection between MS 150 and telephony device 151. If the IN service is to be provided, the MSC 110 sends an IN service activation request (In_Service_Activation) to a Service Control Point (SCP) 120. The SCP 120 responds by sending a Prompt&Collect_User_Information command to the MSC 110—the Prompt&Collect_User_Information command format and parameters are described in Section 9.3.3, et seq., of GSM 0.378 version 6.2.0 Release 1997, as incorporated herein by reference.

According to the principles of the present invention, a Prompt&Collect_User_Information command is used to instruct the MSC 110 to monitor the control channel associated with the MS 150 for the transmission of dialed digits from the MS during an existing call connection between the MS 150 and telephony device 151. Because the dialed digits are transmitted from the MS 150 on a control channel, rather than the voice channel, a party using telephony device 151 will not hear the dialed digits. Upon receiving the dialed digits on the control channel, the MSC 110 sends an acknowledgment message, ACK(dialed digits), to the SCP 120; the acknowledgment message includes the dialed digits received over the control channel associated with the MS 150.

The operation to establish the call connection to the third telephony device 152 can be controlled by the SCP 120 using a resident Service Control Function (SCF). In an exemplary embodiment, the SCF sends a request to the MSC 110 to establish a call connection to the third telephony device 152; the request includes the dialed digits previously received from the MSC 110 in the ACK(dialed digits) acknowledgment message. The MSC 110 can use a resident Service Switching Function (SSF) to establish the call connection. Upon establishing the call connection to the third telephony device 152, the SSF within the MSC 110 then performs the operation of joining the third telephony device 152 in conference with the existing call connection between the MS 150 and the second telephony device 151.

Figure 2:
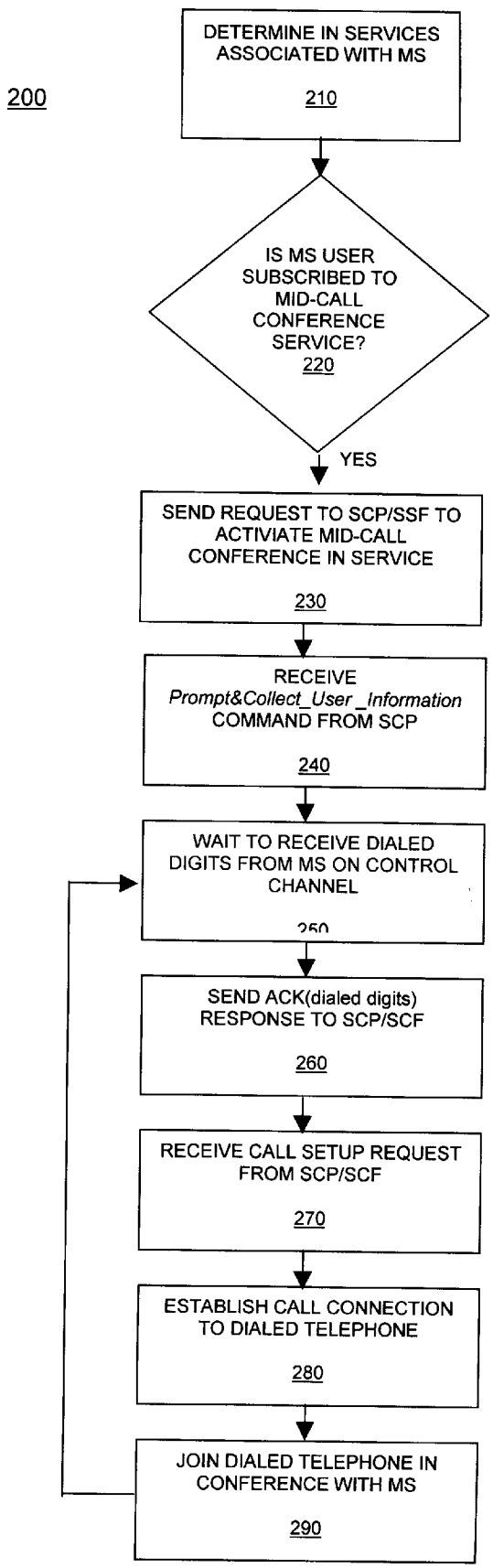
FIG. 2 illustrates a flowchart of an exemplary process for implementing the present invention in a wireless communications network.

Turning now to FIG. 2, with continuing reference to FIG. 1, illustrated is a flowchart of an exemplary process 200 for implementing the present invention in a wireless communications network. In a Step 210, the IN services associated with the MS 150 are determined. This process is typically performed in a conventional wireless network in association with establishing a call connection to or from a MS. If the mobile subscriber associated with the MS 150 is subscribed to the IN service for transparent establishment of a mid-call conference, a request is sent to a SCP to activate the IN service (Step 220).

Upon receiving a request to activate the mid-call conference IN service, the SCP 120 sends a Prompt&Collect_User_Information command, which is received by MSC 110 (Step 240). Upon receiving the Prompt&Collect_User_Information command, the MSC 110 monitors the control channel associated with the MS 150 for the transmission of dialed digits from the MS during an existing call connection between the MS 150 and telephony device 151 (Step 250). The Prompt&Collect_User_Information command includes a parameter that identifies how many dialed digits the MS 150 must transmit. When the MSC 110 has received the proper number of dialed digits, it sends an acknowledgment message, ACK(dialed digits), including the dialed digits to the SCP 120 (Step 260). The dialed digits are received by a SCF within the SCP 120, which then sends a call setup request, Call_Setup(dialed digits), to the MSC 110.

When the MSC 110 receives the call setup request, Call_Setup(dialed digits) in Step 270, a resident SSF is used to establish a call connection to the telephony device identified by the dialed digits, for example telephony device 152. If the telephony device identified by the dialed digits is answered, the resident SSF in MSC 110 joins the telephony device 152 in conference with the existing call connection between MS 150 and telephony device 152, thereby transparently establishing a mid-call conference using MS 150, without requiring an intermediate hold state of the existing call connection between the MS and second telephony device 151.

The use of the mid-call conference IN service disclosed herein has many advantages over conventional methods of establishing a conference connection between multiple telephony devices. First, unlike conventional methods, it is not necessary to place a call party or parties on hold in order to conference a third party; thus, the existing call participants are able to continue a conversation during the process of conferencing additional parties. Second, in a wireless system, a user of a wireless telephony device will not incur additional air-time charges normally associated with the hold period required when using conventional call conferencing methods.

The principles of the present invention are particularly useful when a user of a MS wishes to transfer an existing call to a wireline device to avoid air-time charges. For example, a user of MS 150 might be in an existing call with telephony device 151 while traveling from their office to their home. Upon reaching their home, the user can conference their home telephone 152 to the existing call connection between the MS 150 and telephony device 151, then hang-up their MS 150, leaving only the call connection between telephony device 151 and telephony device 152 active.

From the foregoing, those skilled in the art will recognize that the present invention provides significant advantages to communications systems, in general, and the invention is particularly advantageous in wireless networks. Although the present invention has been described in detail, those skilled in the art will conceive of various changes, substitutions and alterations to the exemplary embodiments described herein without departing from the spirit and scope of the invention in its broadest form. In particular, although certain functions of the present invention have been described only in the context of a GSM network, the principles of the invention can be adapted for implementation in other types of wireless networks. The exemplary embodiments presented herein illustrate the principles of the invention and are not intended to be exhaustive or to limit the invention to the form disclosed; it is intended that the scope of the invention be limited only by the claims appended hereto, and their equivalents.

What is claimed is:

1. A method for providing an Intelligent Network (IN) service to transparently establish a mid-call conference using a Mobile Station (MS) while said MS is communicating with a second telephony device, said method comprising the steps of:
   querying a Home Location Register (HLR) for subscriber information associated with said MS, said subscriber information identifying whether said IN service is to be provided to said MS;
   sending an IN service activation request to a Service Control Point (SCP);
   receiving a Prompt&Collect_User_Information command from said SCP, said command instructing said MSC to monitor said control channel for the transmission of dialed digits from said MS
   monitoring in a Mobile-services Switching Center (MSC) for the transmission of dialed digits over a control channel associated with said MS, said dialed digits identifying a third telephony device;
   sending an acknowledgment message to said SCP, said acknowledgment message including said dialed digits received over said control channel associated with said MS;
   receiving a request from said SCP to establish a call connection to said third telephony device, said request including said dialed digits;
   establishing a call connection to said third telephony device; and
   joining said third telephony device in conference with said MS and said second telephony device, thereby establishing a conference call between said MS and said first and second telephony devices without requiring an intermediate hold state of an existing call connection between said MS and said second telephony device.

2. The method recited in claim 1, wherein said step of establishing a call connection to said third telephony device is controlled by a Service Switching Function (SSF) in said MSC.

3. The method recited in claim 2, wherein said step of joining is controlled by said SSF in said MSC.

4. A Service Control Point (SCP) adapted to provide an Intelligent Network (IN) service to transparently establish a mid-call conference using a Mobile Station (MS) while said MS is communicating with a second telephony device, said SCP including a Service Control Function (SCF) operative to:

receive a request to activate said IN service from a Mobile-services Switching Center (MSC) associated with a geographical service area in which said MS is located;

send a Prompt&Collect_User_Information command to said MSC, said command instructing said MSC to monitor a control channel for the transmission of dialed digits from said MS, said dialed digits identifying a third telephony device to be joined in conference with said MS and said second telephony device; and receive an acknowledgment message from said MSG, said acknowledgment message including said dialed digits received over said control channel associated with said MS.

5. The SCP recited in claim 4, wherein said SCF is further operative to control the establishment of a call connection to said third telephony device.

6. The SCP recited in claim 5, wherein said SCF controls the establishment of said call connection to said third telephony device by sending a call setup request to a Service Switching Function (SSF) in said MSC, said call setup request including said dialed digits.

7. A Mobile-services Switching Center (MSC) adapted to provide an Intelligent Network (IN) service to transparently establish a mid-call conference using a Mobile Station (MS) while said MS is communicating with a second telephony device, said MSC including a Service Switching Function (SSF) operative to:

send a request to activate said IN service to a Service Control Point (SCP);

receive a Prompt&Collect_User_Information command from said SCP, said command instructing said MSC to monitor a control channel for the transmission of dialed digits from said MS, said dialed digits identifying a third telephony device to be joined in conference with said MS and said second telephony device; and send an acknowledgment message to said SCP, said acknowledgment message including said dialed digits received over said control channel associated with said MS.

8. The MSC recited in claim 7, wherein said SCF is further operative to control the establishment of a call connection to said third telephony device.

9. The MSC recited in claim 8, wherein said SSF establishes said call connection to said third telephony device upon receiving a call setup request from said SCP, said call setup request including said dialed digits.

10. The MSC recited in claim 8, wherein said SSF is further operative to join said call connection to said third telephony device in conference with said MS and said second telephony device.

11. A wireless communications network adapted to provide an Intelligent Network (IN) service to transparently established a mid-call conference using a Mobile Station (MS) while said MS is communicating with a second telephony device, said network including:

a Mobile-services Switching Center (MSC); and a Service Control Point (SCP), wherein:

i) said MSC is operative to send a request to said SCP to activate said IN service;

ii) said SCP is operative to send a Prompt&Collect_User_Information command to said MSC, said command instructing said MSC to monitor a control channel for the transmission of dialed digits from said MS, said dialed digits identifying a third telephony device to be joined in conference with said MS and said second telephony device; and, iii) said MSC is operative to send an acknowledgment message to said SCP, said acknowledgment message including said dialed digits received over said control channel associated with said MS.

12. The network recited in claim 11, wherein said SCP is further operative to control the establishment of a call connection to said third telephony device by sending a call setup request to said MSC, said call setup request including said dialed digits.

* * * * *